(12) United States Patent
Faraboschi et al.

(10) Patent No.: US 8,516,271 B2
(45) Date of Patent: Aug. 20, 2013

(54) SECURING NON-VOLATILE MEMORY REGIONS

(75) Inventors: Paolo Faraboschi, Barcelona (ES);
Parthasarathy Ranganathan, San Jose, CA (US); Naveen Muralimanohar, Santa Clara, CA (US)

(73) Assignee: Hewlett-Packard Development Company, L. P., Houston, TX (US)

( * ) Notice: Subject to any disclaimer, the term of this patent is extended or adjusted under 35 U.S.C. 154(b) by 165 days.

(21) Appl. No.: 13/046,381

(22) Filed: Mar. 11, 2011

(65) Prior Publication Data
US 2012/0233472 A1 Sep. 13, 2012

(51) Int. Cl.
*H04L 9/14* (2006.01)
*H04L 9/30* (2006.01)

(52) U.S. Cl.
USPC .................... 713/190; 713/164; 713/193

(58) Field of Classification Search
None
See application file for complete search history.

(56) References Cited

U.S. PATENT DOCUMENTS

| | | | | |
|---|---|---|---|---|
| 5,247,665 | A * | 9/1993 | Matsuda et al. | 1/1 |
| 7,065,215 | B2 * | 6/2006 | Shirakawa et al. | 380/277 |
| 7,194,092 | B1 * | 3/2007 | England et al. | 380/262 |
| 7,337,329 | B2 * | 2/2008 | Evans | 713/189 |
| 7,434,263 | B2 * | 10/2008 | Lampson et al. | 726/27 |
| 7,529,919 | B2 * | 5/2009 | Lampson et al. | 713/1 |
| 7,543,336 | B2 * | 6/2009 | Lampson et al. | 726/30 |
| 7,673,152 | B2 * | 3/2010 | Shirakawa et al. | 713/189 |
| 2003/0135742 | A1 * | 7/2003 | Evans | 713/189 |
| 2005/0114689 | A1 * | 5/2005 | Strom et al. | 713/193 |
| 2006/0191020 | A1 * | 8/2006 | Miller | 726/28 |
| 2006/0224902 | A1 | 10/2006 | Bolt | |
| 2007/0101158 | A1 | 5/2007 | Elliott | |
| 2008/0013718 | A1 * | 1/2008 | Okamoto | 380/30 |
| 2009/0129588 | A1 | 5/2009 | Takakusu et al. | |
| 2010/0005317 | A1 | 1/2010 | Pribadi et al. | |
| 2010/0199109 | A1 * | 8/2010 | Terek et al. | 713/194 |
| 2010/0281273 | A1 * | 11/2010 | Lee et al. | 713/190 |
| 2011/0029786 | A1 * | 2/2011 | Raffard et al. | 713/193 |
| 2012/0110333 | A1 * | 5/2012 | Lukkarila et al. | 713/176 |

OTHER PUBLICATIONS

IBM, "Encrypting a Temporary File System," available at http://publib.boulder.ibm.com/infocenter/lnxinfo/v3r0m0/index.jsp?topic=/liaai/secure/liaaisecureencrypttempfs.htm, accessed on Mar. 11, 2011 (1 page).
Blackberry, "Encrypting user data on a locked BlackBerry device," available at http://docs.blackberry.com/en/admin/deliverables/16648/Encrypting_user_data_on_a_locked_BB_device_834471_11.jsp, accessed on Mar. 11, 2011 (2 pages).

* cited by examiner

*Primary Examiner* — Christopher Revak (57) ABSTRACT

Methods, apparatus and articles of manufacture to secure non-volatile memory regions are disclosed. An example method disclosed herein comprises associating a first key pair and a second key pair different than the first key pair with a process, using the first key pair to secure a first region of a non-volatile memory for the process, and using the second key pair to secure a second region of the non-volatile memory for the same process, the second region being different than the first region.

15 Claims, 9 Drawing Sheets

SECURING NON-VOLATILE MEMORY REGIONS

STATEMENT OF GOVERNMENT RIGHTS

This invention was made with Government support under Contract No. DE-SC0005026 awarded by the Department of Energy. The Government has certain rights in this invention.

BACKGROUND

Non-volatile memory (NVM) is becoming more prevalent in the memory architecture of modem microprocessor systems. For example, the main memory of a microprocessor system could be implemented by dynamic random access memory (DRAM) in combination with NVM, or with NVM acting as a secondary storage backed by a DRAM buffer. It is expected that NVM may even replace DRAM in future microprocessor and other processing systems. The resilience properties of NVM, such as the ability for data stored in NVM to persist after power is removed or a system crash occurs, is one of the driving factors for including NVM in modern memory architectures.

DETAILED DESCRIPTION

Methods, apparatus and articles of manufacture to secure NVM regions are disclosed herein. Due, at least in part, to the ability of data stored in NVM to persist after power is removed or a system crash occurs, NVM is becoming more prevalent in the memory architectures of modern processing systems. However, such data resiliency can make systems employing NVM vulnerable to attacks and data leaks as more of the memory space is able to retain stored data indefinitely, or at least for substantial periods of time after power is removed from the system. Example methods, apparatus and articles of manufacture disclosed herein are able to secure NVM regions of memory such that data is unrecoverable when stored in NVM regions that are designated to contain data that should not persist after power loss, whereas data is recoverable when stored in NVM regions that are designated to contain data that should persist after power loss.

In some examples disclosed herein, a dual-key approach is used to encrypt and decrypt data transferred between cache lines and an NVM. In such examples, a process is assigned or otherwise associated with at least two different encryption/decryption key pairs. One of the key pairs is used to encrypt and decrypt data that is transferred for the process between a cache line and a region of the NVM designated to be ephemeral (e.g., a region that is to contain data that should not survive after loss of power). Another of the key pairs is used to encrypt and decrypt data that is transferred for the process between a cache line and a different region of the NVM designated to be persistent (e.g., a region that is to contain data that should be recoverable after loss of power).

In some examples, data stored in an ephemeral region of the NVM is retrievable using only the decryption key included in the process's ephemeral region key pair. However, in some examples, data stored in a persistent region of the NVM is retrievable using either the decryption key included in the process's persistent region key pair, or another (e.g., different) decryption key maintained by, for example, a recovery service. Furthermore, in some examples, the key pairs associated with a process are stored in volatile memory and, thus, become lost after, for example, a power loss or a system crash. This can prevent recovery of data stored in an ephemeral region of NVM, whereas data stored in a persistent region, but not an ephemeral region, of the NVM can still be recovered using, for example, the decryption key maintained by the recovery service. Accordingly, example methods, apparatus and articles of manufacture disclosed herein can secure regions of the NVM by preventing recovery of data stored in ephemeral regions of the NVM after an intentional or unintentional loss of power, but permitting recovery of data stored in persistent regions only by entities (e.g., such as a recovery service) possessing an appropriate recovery (e.g., decryption) key.

Figure 1:
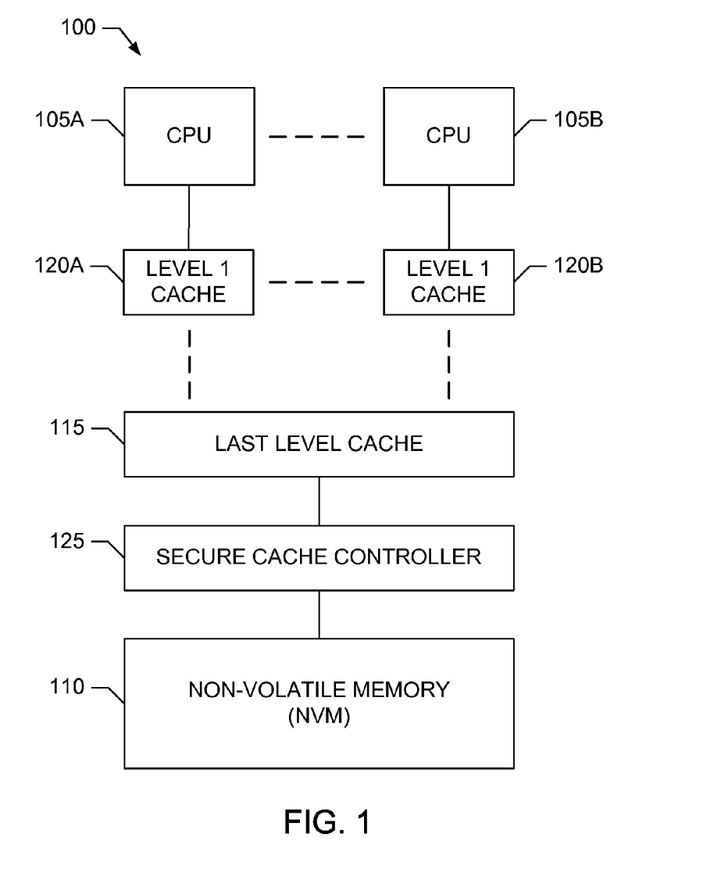
FIG. 1 is a block diagram of an example processing node including an example cache controller to secure regions of an example NVM.

Turning to the figures, a block diagram of an example processing node 100 capable of securing regions of an NVM in accordance with the example methods, apparatus and articles of manufacture disclosed herein is illustrated in FIG. 1. The example processing node 100 can correspond to a microprocessor system or other physical and/or virtual processing system, device, etc. In the illustrated example, the processing node 100 includes one or more example processor cores 105A-B, and an example NVM 110 to implement, at least in part, main memory to store data for one or more processes executing on the processor core(s) 105A-B. The processing node 100 also includes an example last level cache 115 between the processor core(s) 105A-B and the NVM 110 to cache data read from or to be written to the NVM 110. Zero or more intermediate level cache(s) 120A-B can also be included in the processing node 100, as shown in FIG. 1. To control the exchange of data between the last level cache 115 and the NVM 110, and to secure NVM regions in accordance with the examples described herein, the NVM 110 of FIG. 1 further includes an example secure cache controller 125.

Figure 11:
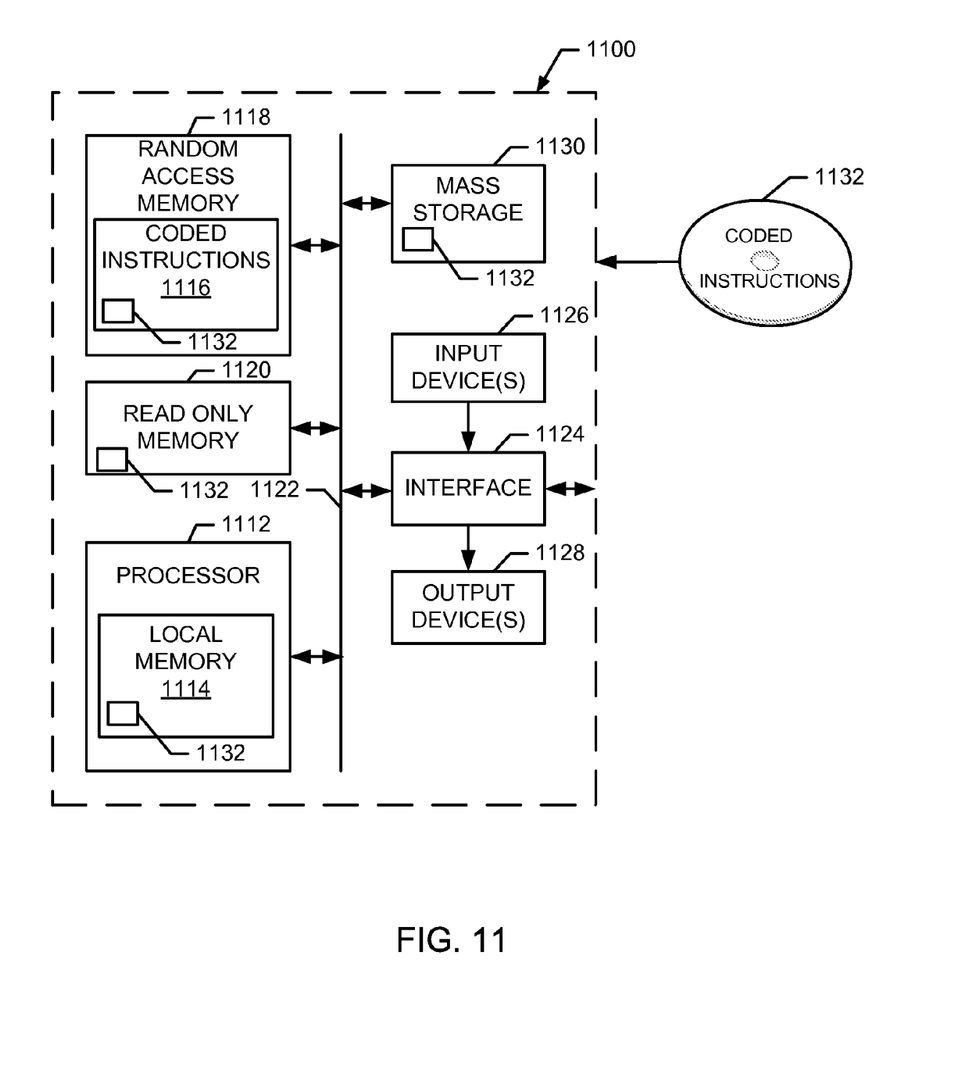
FIG. 11 is a block diagram of an example processing system that may execute example machine readable instructions to implement one or more of the processes of FIGS. 6-9 and/or 10 to implement the example processing node of FIGS. 1 and/or 3, the example cache controller of FIGS. 1 and/or 3, the example key generator of FIG. 3 and/or the example recovery service of FIG. 5.

The processor core(s) 105A-B can be implemented by any type of processor core, central processing unit (CPU), etc., such as one or more of the processors 1112 included in the example processing system 1100 of FIG. 11. The NVM 110 can be implemented by any type of non-volatile memory, such as the example non-volatile memory 1120 included in the processing system 1100 of FIG. 11. The processing system 1100 of FIG. 11 is described in greater detail below.

The intermediate level cache(s) 120A-B can be implemented using any type of caching technology. For example, the intermediate level cache(s) 120A-B can be organized into cache lines, where each cache line can store data from a memory location in the NVM 110. Typically, each cache line also includes a tag containing an address to identify (at least in part) where the cached data is stored in the NVM 110. Similarly, the last level cache 115 is also organized into cache lines, each containing a data part to store data from a memory location in the NVM 110, and a tag containing an address for the data. However, as described in greater detail below, the last level cache 115 is modified such that one or more cache lines further include, or are otherwise associated with, a tag extension or other information field to enable securing of regions of the NVM 110, as described herein.

As mentioned above, data stored in the NVM 110 is retained after an intentional or unintentional loss of power (e.g., corresponding to a system reboot, a system crash, loss of main power, etc.). In a system employing DRAM-based main memory, data stored in main memory is lost after power to the system is removed. As such, if power to a DRAM-based system is removed, a process stack and/or other critical portions of process data are not accessible, thereby preventing a malicious attacker from gaining access to this data and, for example, reverse-engineering process algorithms, retrieving private data, etc. Using NVM, such as the NVM 110, instead of DRAM (or in conjunction with a DRAM) to implement main memory can be beneficial by allowing a process to recover after power loss or system crash because the process stack and/or other critical process data persist in memory. However, such data resiliency also means that the data stored in an NVM, such as the NVM 110, can be susceptible to malicious attacks for much longer periods of time than data stored in DRAM-based memories (and other volatile memories).

The secure cache controller 125 secures regions of the NVM 110 to permit retrieval of portions of process data to be used to recover a process after an intentional or unintentional loss of power, but to prevent retrieval of data that is not used for process recovery. For example, the secure cache controller 125 employs a multi-key (e.g., dual-key) approach to encrypt and decrypt data transferred between cache lines of the last level cache 115 and the NVM 110. In some examples, the secure cache controller 125 implements this multi-key approach by employing a first key pair (e.g., an ephemeral region key pair) to encrypt and decrypt data that is transferred for a process between a cache line of the last level cache 115 and a region of the NVM 110 designated to be an ephemeral region (also referred to as a disposable region of the NVM 110). The secure cache controller 125 also employs a second key pair (e.g., a persistent region key pair), which is different from the first key pair, to encrypt and decrypt data that is transferred for the process between a cache line of the last level cache 115 and a different region of the NVM 110 designated to be a persistent region (also referred to as a recoverable region of the NVM 110). In some examples, data stored in an ephemeral region of the NVM 110 is retrievable using only the decryption key included in the ephemeral region key pair, whereas data is stored in the persistent region is retrievable using a decryption key included in the persistent region key pair, or another (e.g., different) decryption key maintained by, for example, another processing node implementing a recovery service. If, for example, these ephemeral region and persistent region key pairs are stored in a volatile memory at the processing node 100, then data stored in ephemeral region(s) of the NVM 110 is unrecoverable after loss of power (because the ephemeral region key pair is lost), but data stored in persistent region(s) of the NVM 110 is recoverable using, for example, decryption key(s) maintained by the recovery service.

Figure 2:
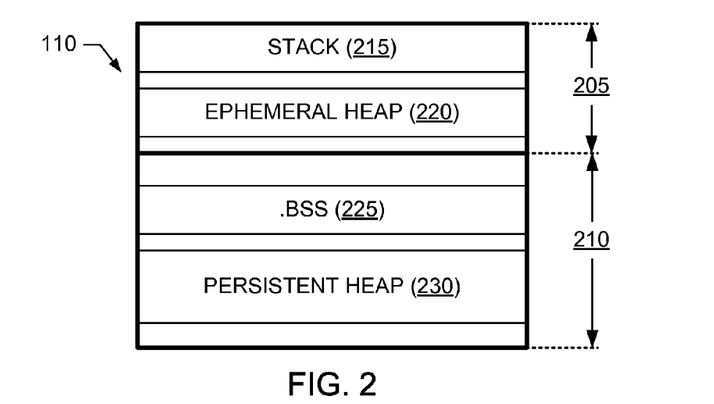
FIG. 2 illustrates an example ephemeral region and an example persistent region included in the NVM of FIG. 1.

Example ephemeral and persistent regions designated or otherwise included in the NVM 110 of FIG. 1 are illustrated in FIG. 2. In the example of FIG. 2, the NVM 110 includes an example ephemeral region 205 and an example persistent region 210. The ephemeral region 205 and/or the persistent region 210 may be specific to a particular process or shared among multiple processes. In the illustrated example, the ephemeral region 205 of the NVM 110 stores data that is not to be used to recover a state of a process after an intentional or unintentional loss of power. For example, the ephemeral region 205 can include a process stack 215, an ephemeral heap 220 (e.g., containing portions of a process heap that are transient in nature), etc. By contrast, the persistent region 210 of the NVM 110 stores data that is to be used to recover the state of the process after an intentional or unintentional loss of power. For example, the persistent region 210 can include a .bss region 225 (e.g., also referred to as a block started by symbol region, which contains statically-allocated variables for the process), a persistent heap 230 (e.g., containing portions of the process heap that represent, at least in part, the state of the process), etc.

Figure 3:
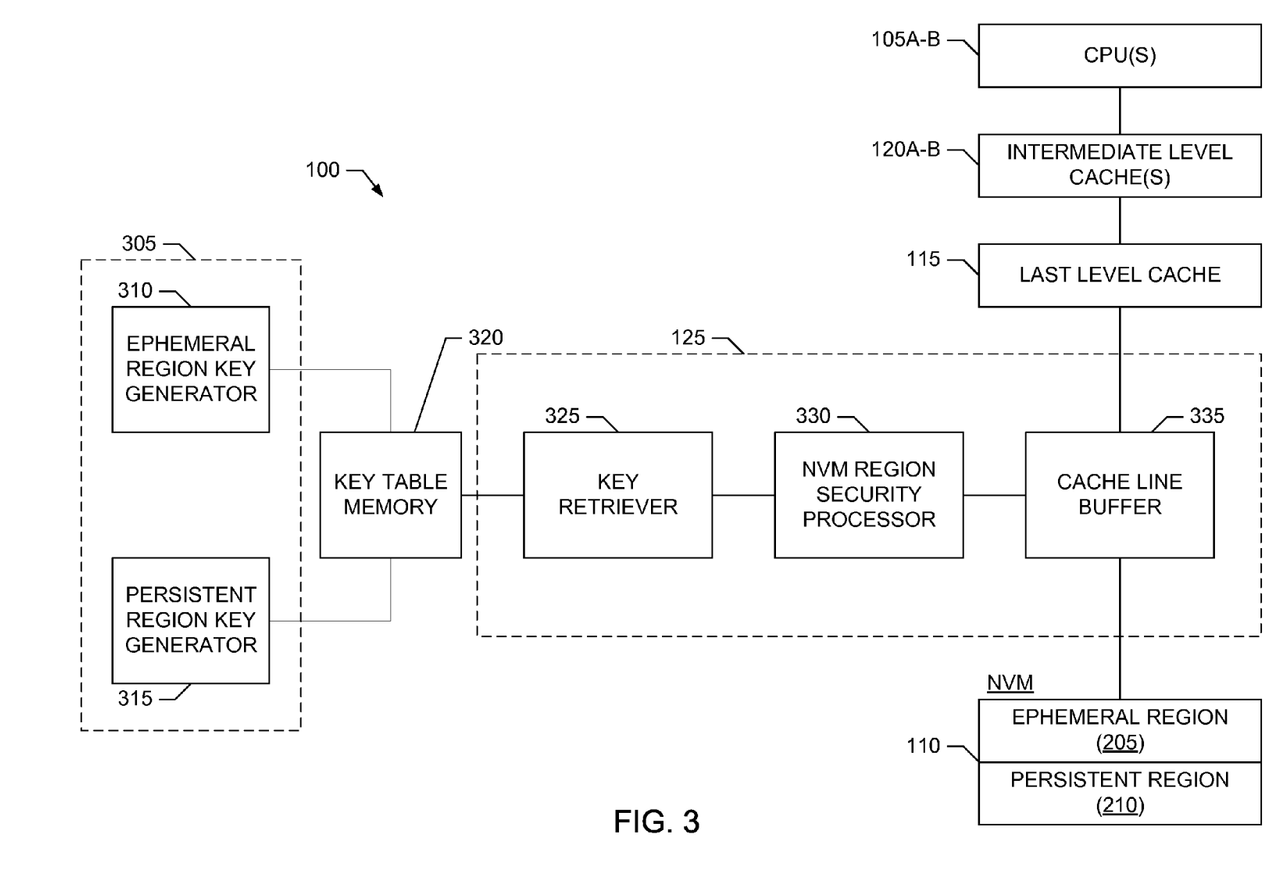
FIG. 3 is a block diagram of an example implementation of the processing node of FIG. 1, which illustrates an example implementation of the cache controller, as well as an example key generator and an example key table that may be used to secure regions of the NVM.

An example implementation of the processing node 100 of FIG. 1 that illustrates an example implementation of the secure cache controller 125 is illustrated in FIG. 3. Similar elements in FIGS. 1, 2 and 3 are labeled with the same reference numerals. Like the example of FIG. 1, the processing node 100 of FIG. 3 includes the NVM 110 and the last level cache 115. The NVM 110 includes the ephemeral region 205 and the persistent region 210 for storing process data for a process executing on the processing node 100.

In the illustrated example, the processing node 100 includes an example key generator 305 to generate encryption and decryption key pairs to encrypt and decrypt data to be exchanged between cache lines of the last level cache 115 and the NVM 110. For example, the key generator 305 can generate keys in accordance with any public key encryption algorithm (e.g., such as, but not limited to, the pretty good privacy (PGP) algorithm). In public key encryption, data is encrypted using a public key that can be shared publicly, but is decrypted using a private key typically known only to the key owner. In the case of public key encryption, to generate an encryption/decryption key pair, the key generator 305 generates a public/private key pair, and uses the public key to determine the encryption key, and the private key to determine the decryption key.

In some examples, the NVM 110 supports multi-tenancy in which multiple processes can share the same physical address space in the NVM 110. In such examples, the key generator 305 generates different (e.g., unique) public/private key pairs to determine different (e.g., unique) encryption/decryption key pairs to be assigned to (or otherwise associated with) different processes executing on the processing node 100. In this way, data stored in the NVM 110 for one process is secure from snooping or other unauthorized retrieval by another process. Furthermore, to support memory regions that are shared among multiple processes, the key generator 305 can determine common public and private keys to be used by the processing sharing a particular memory region. Alternatively, in some examples, the key generator 305 can combine, in accordance with the public key encryption in use, the public keys for the processes that are to share a particular memory region. The key generator 305 then uses this common public key to determine a common encryption key for use in encrypting the process data to be stored in this shared memory region. However, the individual decryption keys determined from the individual private keys associated with the processes sharing the memory region can each still be used to decrypt the process data stored in the shared memory region.

As described above, the secure cache controller 125 employs a multi-key approach in which multiple key pairs are associated with a particular process and used to secure respective different regions of the NVM 110 for the process. For example, the secure cache controller 125 can use a first encryption/decryption key pair (e.g., also referred to as an ephemeral region key pair) to secure the ephemeral region 205 of the NVM 110 for a particular process, and a second encryption/decryption key pair (e.g., also referred to as a persistent region key pair) to secure the persistent region 210 of the NVM 110 for the particular process. To support this multi-key approach, the key generator 305 includes an example ephemeral region key generator 310 to generate ephemeral key pairs for processes executing on the processing node 100, and a persistent region key generator 315 to generate persistent key pairs for the processes executing on the processing node 100.

In some examples, the ephemeral region key generator 310 generates a public/private key pair for a particular process. The ephemeral region key generator 310 then uses the public key as the encryption key of the ephemeral region key pair for this process, and the private key as the decryption key of the ephemeral region key pair for this process. In some examples, the persistent region key generator 315 generates a different public/private key pair that is used as the encryption and decryption keys, respectively, of the persistent region key pair for the process (e.g., and which is also provided to a recovery service for use as the recovery key pair for this process). However, in other examples, the persistent region key generator 315 also uses the public/private key pair generated by the ephemeral region key generator 310 to determine the persistent region key pair for this process. For example, the persistent region key generator 315 can also use the private key as the decryption key included in the persistent region key pair for this process. However, to determine the encryption key included in the persistent region key pair for this process, the persistent region key generator 315 combines the public key generated for the process with another public key associated with (e.g., provided by) a recovery service. Thus, data encrypted by the encryption key included in the ephemeral region key pair can be decrypted by only the decryption key included in the ephemeral region key pair. However, data encrypted by the encryption key included in the persistent region key pair can be decrypted by the decryption key included in the persistent region key pair, or by the recovery decryption key (e.g., which may be the same or different from the decryption key of the persistent region key pair) associated with (e.g., maintained by) the recovery service.

In the illustrated example of FIG. 3, the processing node 100 also includes an example key table memory 320 to store the ephemeral region and persistent region key pairs generated by the key generator 305 for different processes executing on the processing node 100. In some examples, the key table memory 320 stores the ephemeral region and persistent region key pairs for a particular process in a key table associated with the process. In some examples, the key table memory 320 is implemented by any type of volatile memory (e.g., such as volatile register(s), cache(s), etc.) such that the ephemeral region key pairs for the different processes are lost (e.g., deleted) when the processing node 100 experiences a loss of power. In this way, data stored in the ephemeral region(s) 205 of the NVM 100 is unrecoverable after the power loss. In some examples, the persistent region key pairs for the different processes can also be stored in volatile memory (e.g., in the same key tables as the ephemeral region key pairs) and, thus, lost after a power loss, because data stored in the persistent region(s) 210 of the NVM can also be recovered with the decryption key maintained separately by the recovery service. An example of a key table that can be stored in the key table memory 320 is illustrated in FIG. 4, which is described in greater detail below.

To secure regions of the NVM 110 using the keys generated by the key generator 305, the secure cache controller 125 includes an example key retriever 325, an example NVM region security processor 330 and an example cache line buffer 335. In some examples, the NVM region security processor 330 can implement any public key encryption algorithm, such as the public key encryption algorithm corresponding to the algorithm used by the key generator 305 to generate the encryption/decryption key pairs. As such, the NVM region security processor 330 uses an encryption key associated with a process to encrypt data to be written from a cache line of the last level cache 115 to the NVM 110 for the process. Conversely, the NVM region security processor 330 uses a decryption key associated with the process to decrypt data to be read from the NVM 110 and stored, for the process, in a cache line of the last level cache 115. The cache line buffer 335 is provided in the processing node 100 of FIG. 3 as a temporary buffer for use by the NVM region security processor 330 when encrypting and/or decrypting data to be exchanged between the NVM 110 and a cache line of the last level cache 115.

The key retriever 325 is included in the processing node 100 to retrieve an appropriate key for use by the NVM region security processor 330 to perform data encryption or decryption. For example, the key retriever 325 retrieves an encryption or decryption key from either the ephemeral region key pair or the persistent region key pair stored in the key table memory 320 for a particular process based on whether the data to be encrypted or decrypted by the NVM region security processor 330 is associated with the ephemeral region 205 or the persistent region 210 of the NVM 110. In some examples, one or more address bits or lines representing the address of the data in NVM can be used by the key retriever 325 to determine whether the data is associated with (e.g., to be read from or written to) either the ephemeral region 205 or the persistent region 210 of the NVM 110.

Figure 4:
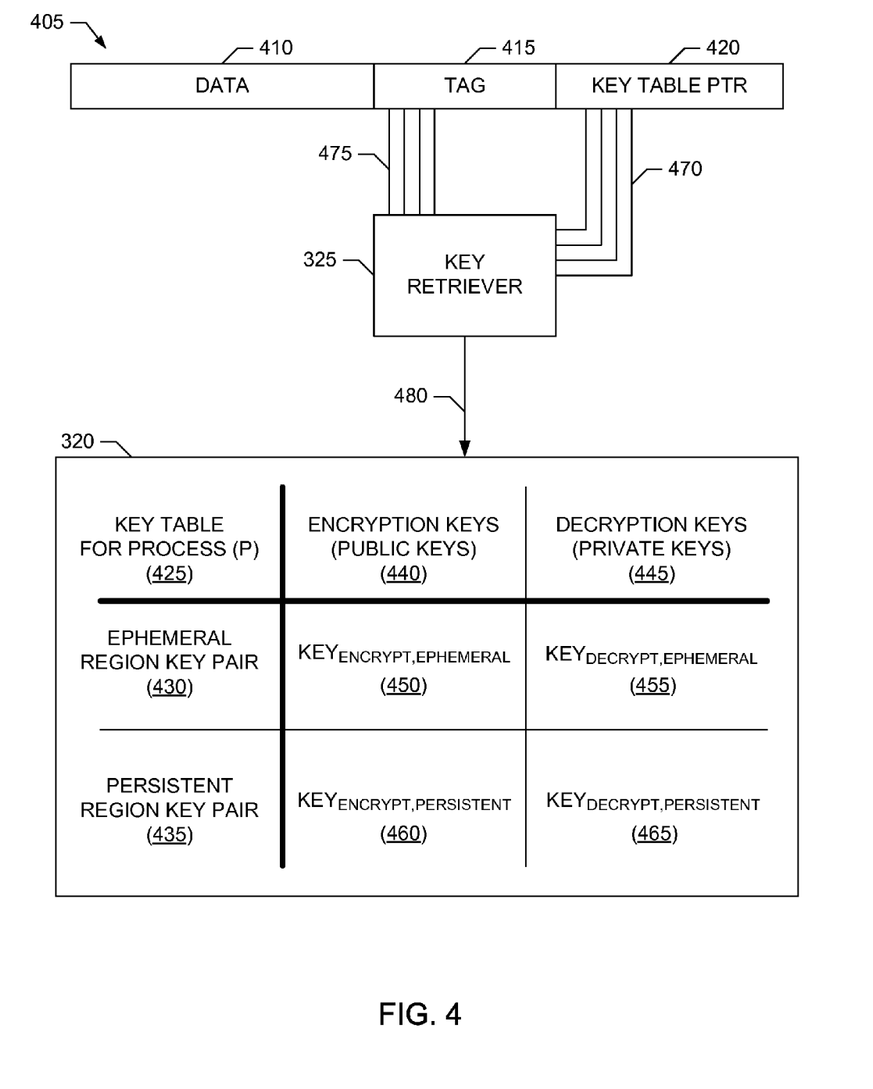
FIG. 4 is a block diagram illustrating an example key retrieval processing performed by the cache controller in the example processing node of FIGS. 1 and/or 3.

A block diagram further illustrating an example key retrieval processing that can be performed by the secure cache controller 125 of FIG. 3 is illustrated in FIG. 4. Similar elements in FIGS. 3 and 4 are labeled with the same reference numerals. The example of FIG. 4 includes an example cache line 405 (e.g., from the last line cache 115 of FIG. 3), which is processed by the key retriever 325 to retrieve an appropriate key from the key table memory 320 for use in encrypting or decrypting the data to be exchanged between the cache line 405 and, for example, the NVM 110. In the illustrated example, the cache line 405 includes an example data section 410 containing data read from or to be written to the NVM 110, and an example tag containing an address representing (at least in part) a location in the NVM 110 for the data stored in the data section 410.

In some examples, the cache line 405 further includes an example tag extension 415, which may be, for example, an extension of the tag in the data section 410, a second tag included in the cache line 405, a data buffer associated with the cache line 405, etc. In the illustrated example, the tag extension 415 stores a pointer to an example key table 425 stored in the key table memory 320 for the process whose data is (or is to be) stored in the data section 410. For example, the key table 425 for a particular process (e.g., designated as "P" in FIG. 4) can include two entries (e.g., rows) represented as, for example, one row 430 to store the ephemeral region key pair for the process, and another row 435 to store the persistent region key pair for the process. Each key pair includes two entries (e.g., columns) for the keys making up the key pair, which can be represented as, for example, one column 440 to store the encryption key included in the key pair, and another column 445 to store the decryption key included in the key pair. For example, in the key table 425 for process P, the row 430 for P's ephemeral region key pair contains an ephemeral encryption key 450 and an ephemeral decryption key 455 making up the ephemeral region key pair, whereas the row 435 for P's persistent region key pair contains a persistent encryption key 460 and a persistent decryption key 465 making up the persistent region key pair.

In some examples, the key table 425 for a particular process P is stored in a location of the key table memory 320 that is based on a process identifier (ID) representing the process P. For example, the location of the key table 425 in the key table memory 320 may be determined from a hash and/or mapping of the process ID for the process P. As such, in some examples, the key table pointer stored in the tag extension 420 of the cache line 405 is determined based on P's process ID (e.g., by hashing, mapping, etc. and/or otherwise processing the process ID) to determine the pointer to the key table 425 in the key table memory 320.

Additionally, in some examples, the run-time architecture specification of the processing node 100 may allocate different ranges of the address space to the ephemeral region(s) 205 and the persistent region(s) 210. In such examples, the address stored in the tag 415 of the cache line 405 (e.g., which represents, at least in part, the location in the NVM 110 of the data stored in the data section 410) can be used to determine whether the data stored in the data section 410 is associated with an ephemeral region (e.g., the ephemeral region 205) or a persistent region (e.g., the persistent region 210) of the NVM 110. As such, the address in the tag 415 (e.g., such as one or more of the most significant bits (MSBs) of the address bits/lines in the tag 415) can be used to determine a pointer to either the key pair entry 430 (e.g., corresponding to the ephemeral region 205 of the NVM 110) or the key pair entry 435 (e.g., corresponding to the persistent region 210 of the NVM 110) of the key table 425.

Accordingly, in the illustrated example, the key retriever 325 processes one or more (or all) of the bits/lines 470 of the tag extension 420 containing the key table pointer, along with one or more (or all) of the address bits/lines 475 of the tag 415, to determine a key pointer 480. In some examples, the key pointer 480 points to either the row/entry 430 for the ephemeral region key pair stored in the key table 425, or the row/entry 435 for the persistent region key pair stored in the key table 425. For the particular key pair row/entry 430 or 435 pointed to by the key pointer 480, the key retriever 325 then selects either the encryption key stored in the encryption key column 440 or the decryption key stored in the decryption key column 445 for the selected key pair entry based on whether the data stored in the data segment 410 of the cache line 405 is to be encrypted or decrypted. In other examples, the key retriever 325 determines the key pointer 480 to point to a specific one of the key entries 450, 455, 460 or 465 of the key table 425.

While example manners of implementing the processing node 100 and the secure cache controller 125 have been illustrated in FIGS. 1-4, one or more of the elements, processes and/or devices illustrated in FIGS. 1-4 may be combined, divided, re-arranged, omitted, eliminated and/or implemented in any other way. Further, the example processor core(s) 105A-B, the example NVM 110, the example last level cache 115, the example intermediate level cache(s) 120A-B, the example key generator 305, the example ephemeral region key generator 310, the example persistent region key generator 315, the example key table memory 320, the example key retriever 325, the example NVM region security processor 330, the example cache line buffer 335, the example cache line 405 and/or, more generally, the example processing node 100 and/or the example secure cache controller 125 of FIGS. 1-4 may be implemented by hardware, software, firmware and/or any combination of hardware, software and/or firmware. Thus, for example, any of the example processor core(s) 105A-B, the example NVM 110, the example last level cache 115, the example intermediate level cache(s) 120A-B, the example key generator 305, the example ephemeral region key generator 310, the example persistent region key generator 315, the example key table memory 320, the example key retriever 325, the example NVM region security processor 330, the example cache line buffer 335, the example cache line 405 and/or, more generally, the example processing node 100 and/or the example secure cache controller 125 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus claims are read to cover a purely software and/or firmware implementation, at least one of the example processing node 100, the example secure cache controller 125, the example processor core(s) 105A-B, the example NVM 110, the example last level cache 115, the example intermediate level cache(s) 120A-B, the example key generator 305, the example ephemeral region key generator 310, the example persistent region key generator 315, the example key table memory 320, the example key retriever 325, the example NVM region security processor 330, the example cache line buffer 335 and/or the example cache line 405 are hereby expressly defined to include a tangible computer readable medium such as a memory, digital versatile disk (DVD), compact disk (CD), etc., storing such software and/or firmware. Further still, the example processing node 100 and/or the example secure cache controller 125 of FIGS. 1-4 may include one or more elements, processes and/or devices in addition to, or instead of, those illustrated in FIGS. 1-4, and/or may include more than one of any or all of the illustrated elements, processes and devices.

Figure 5:
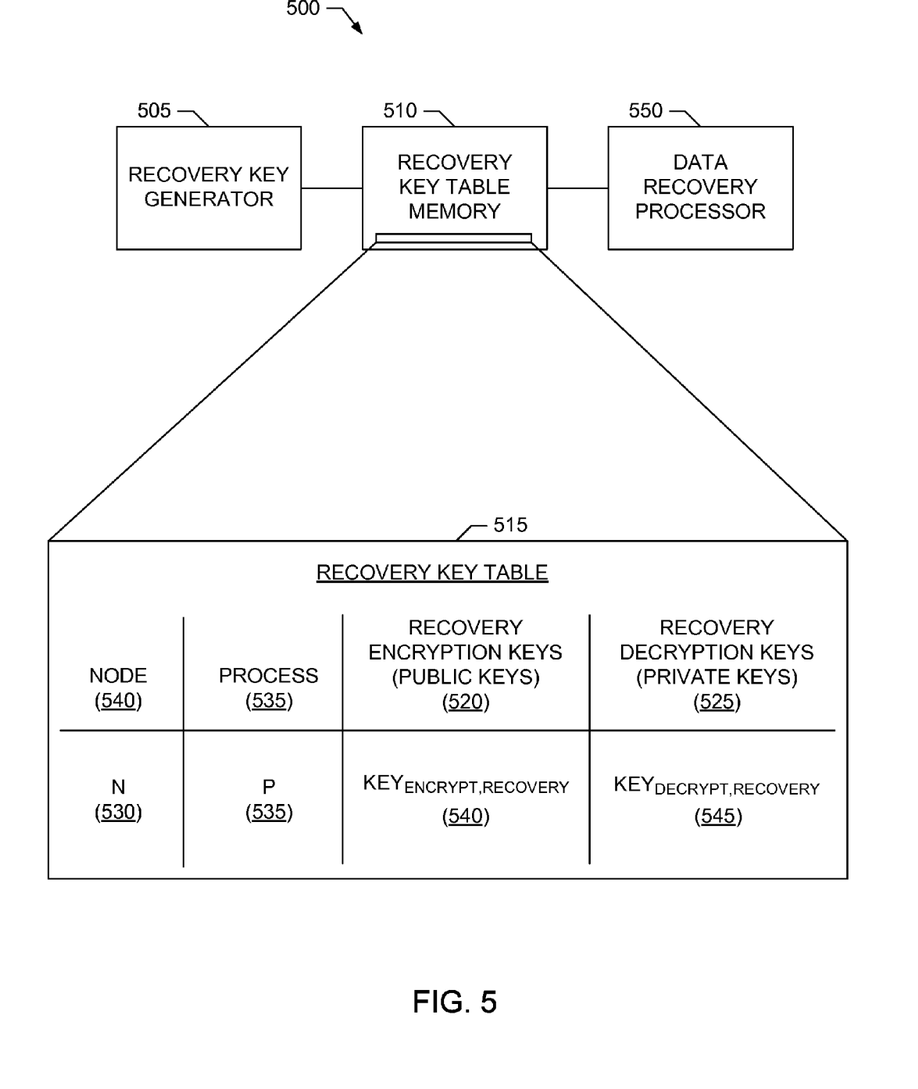
FIG. 5 is a block diagram of an example recovery service that can be used to recover data stored in persistent regions of the NVM of FIGS. 1-3.

An example block diagram of a recovery service 500 that may be used to recover data stored in, for example, the persistent region 210 of the NVM 110 of FIGS. 1-3 is illustrated in FIG. 5. The recovery service 500 can be tied to a particular node, such as the processing node 100, or included as part of a management service to manage several processing nodes, etc. As such, the recovery service 500 can be used to recover data stored in persistent region(s) of an NVM (e.g., such as the persistent region 210 of the NVM 110) to enable process states to be recovered and, for example, allow processes to be restarted on a same node and/or migrated to other (e.g., backup) nodes after power loss, system reboot, system crash, etc.

In the illustrated example of FIG. 5, the recovery service 500 includes an example recovery key generator 505 to generate key pairs associated with a particular process (P) at a particular processing node (N) for which data stored in persistent region(s) of an NVM are to be recoverable. Similar to the key generator 305 of FIG. 3, in some examples, the recovery key generator 505 can generate public/private key pairs for a process (P) in accordance with any public key encryption algorithm. In some examples, the key generator 305 provides the public key generated for the process (P) to its associated processing node (N), such as the processing node 100, for use in determining a persistent region encryption key for this process, as described above. The associated private key is retained by the recovery service 500 for use as a recovery decryption key for the process (P) to decrypt data encrypted at the node (N) using the persistent region encryption key determined from the public key generated by the recovery key generator 505.

In other examples, the key generator 305 can receive both the recovery encryption key and the recovery decryption key from the processing node 100, instead of generating the recovery key pair itself. Alternatively, the key generator 305 can generate and provide both the recovery encryption key and the recovery decryption key from the processing node 100, which will use these keys as the persistent region key pair. In these latter two examples, the recover key pair is that same as the persistent region key pair.

The recovery service 500 also includes an example recovery key table memory 510 to store a recovery key table 515 containing recovery keys for process(es) and node(s) for which data is to be recoverable from persistent regions of an NVM. In the illustrated example, the recovery key table 515 includes entries 520 (e.g., in the form a column 520) to store the recovery encryption keys (e.g., such as the public keys) generated or received by the recovery key generator 505. The recovery key table 515 also includes entries 525 (e.g., in the form a column 525) to store the associated recovery decryption keys (e.g., such as the private keys) generated or received by the recovery key generator 505. The recovery key table 515 is indexed by process entries 535 (e.g., in the form of a process column 535) and node entries 540 (e.g., in the form of a node column 540) identifying the particular process and processing node associated with a particular recovery encryption/decryption key pair. As such, a row in the recovery key table 515 for a particular processing node 540 and process 535 includes the recovery encryption (e.g., public) key 540 generated or received by the recovery key generator 505 for this node and process, as well as the recovery decryption (e.g., private) key 545 generated or received by the recovery key generator 505 for this node and process.

In some examples, the recovery key table 515 also includes boundary information to define the persistent regions in an NVM for a particular process (P) at a particular node (N). For example, such boundary information may be included when the sizes of the ephemeral and/or persistent regions in an NVM are allowed to vary. In examples where the sizes of the ephemeral and persistent regions in an NVM are fixed across processes (P) and nodes (N), such boundary information may be omitted.

The recovery service 500 of the illustrated example further includes an example data recovery processor 550 to recover, for a particular process (P) at a particular node (N), data stored in a persistent region(s) of an NVM. For example, the data recovery processor 550 can receive a request to recover persistent data from an NVM for a particular process (P) at a particular node (N) (e.g., to permit the process P to be restarted or migrated to another node after the particular node N has suffered a power loss or a system crash). Upon receiving the request, the data recovery processor 550 retrieves the recovery decryption key for this process from the appropriate entry 525 of the recovery key table 515 and uses the retrieved key to decrypt the process data stored in a persistent region of the NVM for the process (P) at node (N).

While an example manner of implementing the recovery service 500 has been illustrated in FIG. 5, one or more of the elements, processes and/or devices illustrated in FIG. 5 may be combined, divided, re-arranged, omitted, eliminated and/or implemented in any other way. Further, the example recovery key generator 505, the example recovery key table memory 510, the example data recovery processor 550 and/or, more generally, the example recovery service 500 of FIG. 5 may be implemented by hardware, software, firmware and/or any combination of hardware, software and/or firmware. Thus, for example, any of the example recovery key generator 505, the example recovery key table memory 510, the example data recovery processor 550 and/or, more generally, the example recovery service 500 could be implemented by one or more circuit(s), programmable processor(s), ASIC(s), PLD(s) and/or FPLD(s), etc. When any of the appended apparatus claims are read to cover a purely software and/or firmware implementation, at least one of the example recovery service 500, the example recovery key generator 505, the example recovery key table memory 510 and/or the example data recovery processor 550 are hereby expressly defined to include a tangible computer readable medium such as a memory, DVD, CD, etc., storing such software and/or firmware. Further still, the example recovery service 500 of FIG. 5 may include one or more elements, processes and/or devices in addition to, or instead of, those illustrated in FIG. 5, and/or may include more than one of any or all of the illustrated elements, processes and devices.

Flowcharts representative of example processes that may be executed to implement the example processing node 100, the example secure cache controller 125, the example processor core(s) 105A-B, the example NVM 110, the example last level cache 115, the example intermediate level cache(s) 120A-B, the example key generator 305, the example ephemeral region key generator 310, the example persistent region key generator 315, the example key table memory 320, the example key retriever 325, the example NVM region security processor 330, the example cache line buffer 335, the example cache line 405, the example recovery service 500, the example recovery key generator 505, the example recovery key table memory 510 and/or the example data recovery processor 550 are shown in FIGS. 6-10. In these examples, the processes represented by each flowchart may be implemented by one or more programs comprising machine readable instructions for execution by a processor, such as the processor 1112 shown in the example processing system 1100 discussed below in connection with FIG. 11. Alternatively, the entire program or programs and/or portions thereof implementing one or more of the processes represented by the flowcharts of FIGS. 6-10 could be executed by a device other than the processor 1112 (e.g., such as a controller and/or any other suitable device) and/or embodied in firmware or dedicated hardware (e.g., implemented by an ASIC, a PLD, an FPLD, discrete logic, etc.). Also, one or more of the processes represented by the flowchart of FIGS. 6-10, or one or more portion(s) thereof, may be implemented manually. Further, although the example processes are described with reference to the flowcharts illustrated in FIGS. 6-10, many other techniques for implementing the example methods and apparatus described herein may alternatively be used. For example, with reference to the flowcharts illustrated in FIGS. 6-10, the order of execution of the blocks may be changed, and/or some of the blocks described may be changed, eliminated, combined and/or subdivided into multiple blocks.

As mentioned above, the example processes of FIGS. 6-10 may be implemented using coded instructions (e.g., computer readable instructions) stored on a tangible computer readable medium such as a hard disk drive, a flash memory, a read-only memory (ROM), a CD, a DVD, a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 6-10 may be implemented using coded instructions (e.g., computer readable instructions) stored on a non-transitory computer readable medium, such as a flash memory, a ROM, a CD, a DVD, a cache, a random-access memory (RAM) and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. Also, as used herein, the terms "computer readable" and "machine readable" are considered equivalent unless indicated otherwise.

Figure 6:
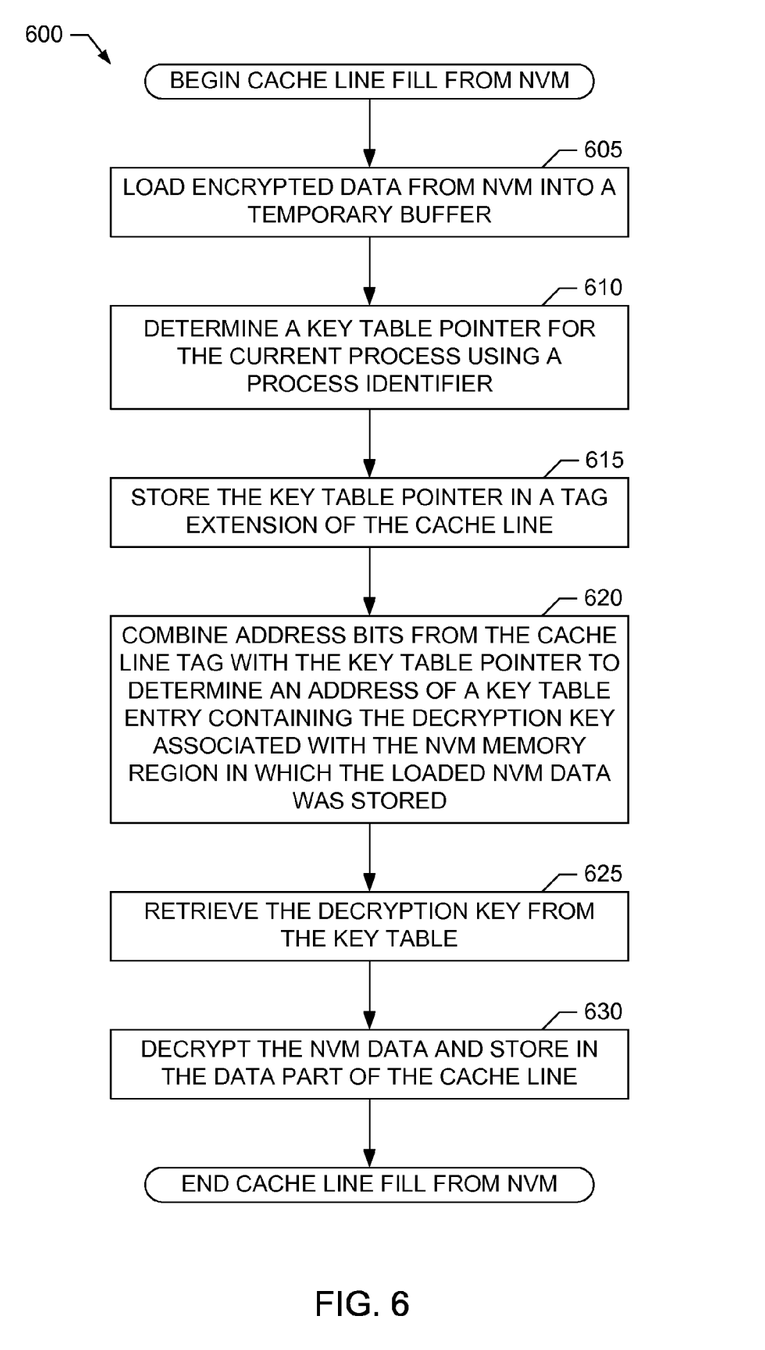
FIG. 6 is a flowchart representative of an example process to perform cache line filling from an NVM that may be used to implement the example cache controller of FIGS. 1 and/or 3.

An example process 600 that may be executed to implement the secure cache controller 125 of FIGS. 1 and/or 3 is represented by the flowchart shown in FIG. 6. The example process 600 can be used to perform cache line refilling by, for example, reading data for a process from the NVM 110 for storage in the cache line 405 of the last level cache 115. With reference to the preceding figures, the process 600 begins execution at block 605 of FIG. 6 at which the secure cache controller 125 reads data from the NVM 110 that is to be stored in the cache line 405 of the last level cache 115 for a particular process (P). At block 605, the secure cache controller 125 stores the data that was read from the NVM 110 in its cache line buffer 335. As described above, the data read from NVM 110 has been encrypted using, for example, either the ephemeral region encryption key 450 or the persistent region encryption key 460 for the process depending on whether the data was stored in the ephemeral region 205 or the persistent region 210 of the NVM 110. As such, at block 605, the secure cache controller 125 stores the data read from the NVM 110 in the cache line buffer 335 to enable the data to be decrypted before being written to the cache line 405 of the last level cache 115.

Next, at block 610 the key retriever 325 of the secure cache controller 125 determines a key table pointer pointing to the key table 425 stored in the key table memory 320 for the particular process (P). For example, the key retriever 325 can determine the key table pointer based on the process ID of the particular process (P), as described above. At block 615, the key retriever 325 stores the key table pointer that points to the key table 425 in the tag extension 420 of the cache line 405 in which the data read from the NVM 110 is to be stored.

At block 620, the key retriever 325 combines the key table pointer stored in the tag extension 420 with one or more of the address bits/lines stored in the tag 415 of the cache line 405 (in which the data read from NVM 110 is to be stored) to determine a key pointer pointing to the particular decryption key to be used to decrypt the data in the cache line buffer 335 for writing it to the data segment 410 of the cache line 405. For example, at block 620 the key retriever 325 can use the key table pointer to determine the key table 425 for the process (P). Then, the key retriever 325 can use one or more of the address MSBs stored in the tag 415 to identify whether the data was read from the ephemeral region 205 or the persistent region 210 of the NVM 110 to thereby determine an offset into the table 425 to point to either the ephemeral region key pair 430 or the persistent region key pair 435.

At block 625, the key retriever 325 uses the key pointer determined at block 620 to retrieve, for example, either the ephemeral region decryption key 455 or the persistent region decryption key 465 from the key table 425 for the process (P). The ephemeral region decryption key 455 and the persistent region decryption key 465 associated with the process (P) may be different (e.g., private) keys or the same (e.g., private) key, as described above. At block 630, the NVM region security processor 330 of the secure cache controller 125 decrypts the data stored in the cache line buffer 335 using the decryption key retrieved at block 625. At block 630, the NVM region security processor 330 also writes the decrypted data to the data segment 410 of the cache line 405 that is to store this data for the process (P) in the last level cache 115. As such, the data stored in the last level cache 115 is unencrypted (e.g., cleartext) to support, for example, fast processing, whereas the data in the NVM 110 is encrypted and, thus, secure. Execution of the example process 600 then ends.

Figure 7:
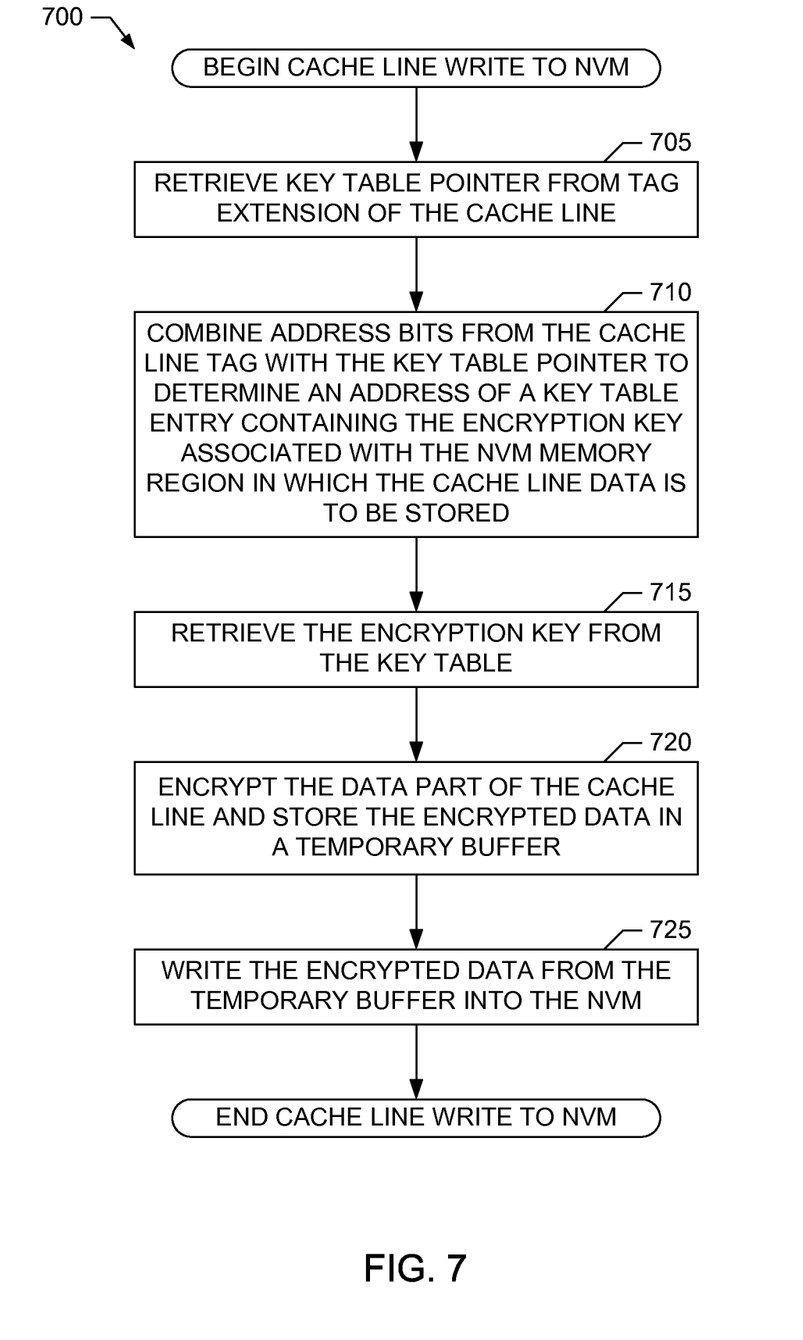
FIG. 7 is a flowchart representative of an example process to perform cache line writing to an NVM that may be used to implement the example cache controller of FIGS. 1 and/or 3.

An example process 700 that may be executed to implement the secure cache controller 125 of FIGS. 1 and/or 3 is represented by the flowchart shown in FIG. 7. The example process 700 can be used to perform cache line eviction or writebacks by, for example, writing data for a process from the cache line 405 of the last level cache 115 to the NVM 110. With reference to the preceding figures, the process 700 begins execution at block 705 of FIG. 7 at which the key retriever 325 retrieves a key table pointer stored in the tag extension 420 of the cache line 405 containing the data to be written back to the NVM 110. As described above, the key table pointer points to the key table 425 of the process (P) whose data is stored in the cache line 405 of the last level cache 115.

Next, similar to the processing performed at block 620 of FIG. 6, at block 710 the key retriever 325 combines the key table pointer retrieved at block 705 from the tag extension 420 with one or more of the address bits/lines stored in the tag 415 of the cache line 405 (containing the data to be written back NVM 110) to determine a key pointer pointing to the particular encryption key to be used to encrypt the data before writing it to the NVM 110. As described above, the secure cache controller 125 encrypts data to be stored in the NVM 100 for a particular process (P) using, for example, either the ephemeral region encryption key 450 or the persistent region encryption key 460 stored in the key table 425 for the process (P) depending on whether the data is to be stored in the ephemeral region 205 or the persistent region 210 of the NVM 110. As such, at block 710 the key retriever 325 determines the key pointer such that it points to either the ephemeral region encryption key 450 or the persistent region encryption key 460 stored in the key table 425 for the process (P) depending on the region of the NVM 110 to which the data from the cache line 405 is to be stored (e.g., which can be determined based on one or more of the address bits/lines stored in the tag 410 of the cache line 405).

At block 715, the key retriever 325 uses the key pointer determined at block 710 to retrieve, for example, either the ephemeral region encryption key 450 or the persistent region encryption key 460 from the key table 425 for the process (P). In some examples, the ephemeral region encryption key 450 for the process (P) can be a local (e.g., public) key resident in the processing node 100 and is lost after, for example, the processing node 100 experiences a power loss. In some examples, the persistent region encryption key 460 can be a different (e.g., public) key, or a combined (e.g., public) key formed by, for example, combining the local (e.g., public) key for the process with another (e.g., public) key provided by a recovery service or other processing entity/node, as described above. At block 720, the NVM region security processor 330 of the secure cache controller 125 uses the cache line buffer 335 to encrypt the data stored in the data segment 410 of the cache line 405 using the encryption key retrieved at block 715. At block 725, the secure cache controller 125 then writes the encrypted data to the appropriate location in the NVM 110. Execution of the example process 700 then ends.

In some examples, the overhead incurred by the examples of FIGS. 6 and 7 to decrypt and encrypt data exchanged between the NVM 110 and the last level cache 115 can increase memory access latency (e.g., if this processing occurs in a critical memory access path). To reduce this latency, in some examples, encryption and decryption in accordance with the example methods, apparatus and articles of manufacture described herein is limited to only certain (e.g., key) data structures used by a process, without which it would be difficult for a malicious attacker to reverse-engineer process algorithms, access private data, etc. Examples of such key data structures include, but are not limited to, page tables, process control blocks, etc. Additionally or alternatively, processing overhead can be reduced in some examples by designating only certain processes to be recoverable, for which the example methods, apparatus and articles of manufacture described herein are employed to secure regions of NVM 110.

Figure 8:
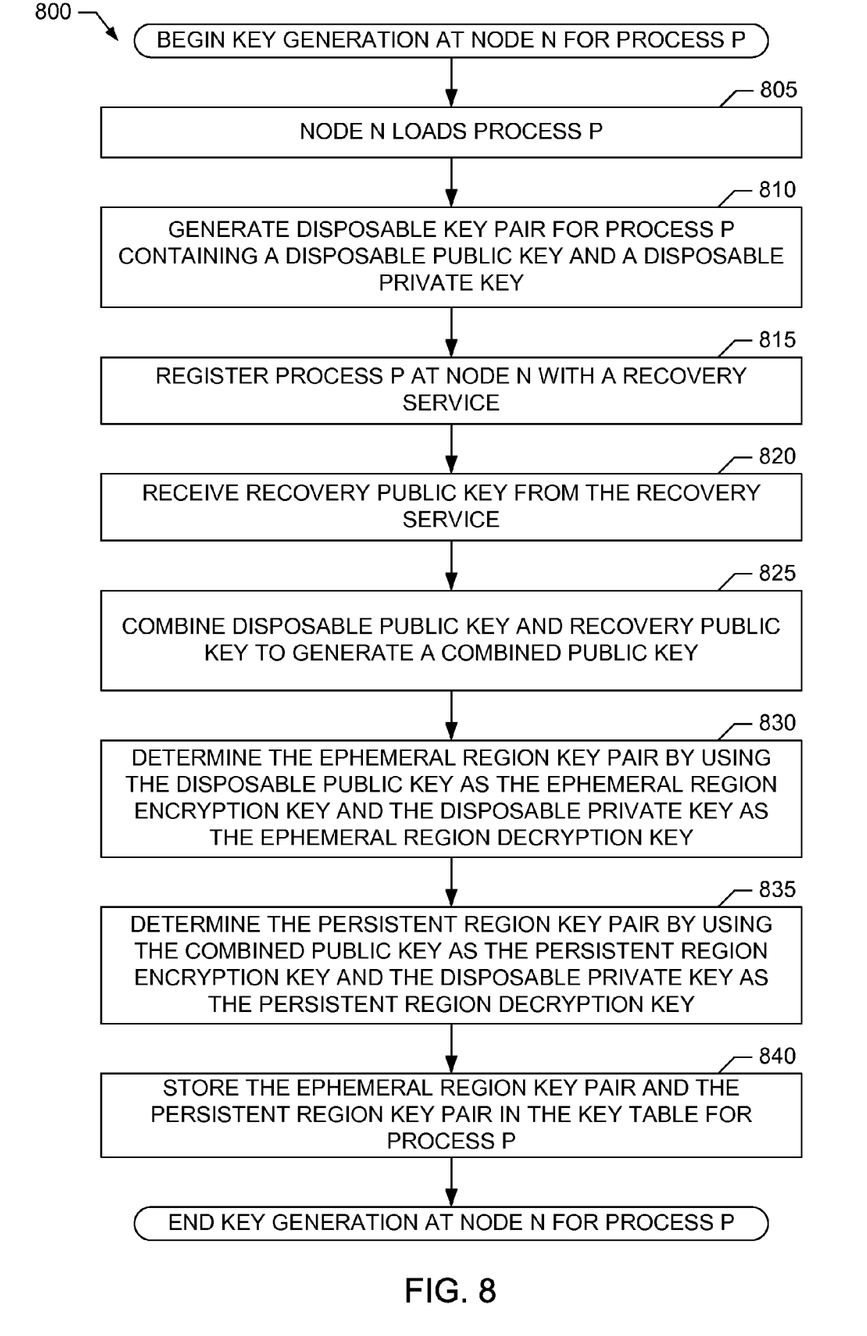
FIG. 8 is a flowchart representative of an example process to perform key generation that may be used to implement the example key generator of FIG. 3.

An example process 800 that may be executed to implement the key generator 305 of the processing node 100 of FIG. 3 is represented by the flowchart shown in FIG. 8. With reference to the preceding figures, the process 800 begins execution at block 805 of FIG. 8 at which the processing node 100 (referred to as node N in FIG. 8) loads a particular process (referred to as process P in FIG. 8). At block 810 (e.g., which may be triggered by loading of the particular process (P) at block 805), the ephemeral region key generator 310 of the key generator 305 generates a local public and private key pair for the process (P). In some examples, the public and private keys generated at block 810 for the process (P) are referred to as disposable because these keys are to be stored locally at the processing node 100 in volatile memory such that these keys are lost when the node 100 experiences an intentional or unintentional loss of power.

At block 815, the key generator 305 or, more generally, the processing node 100 registers the process (P) at the node 100 with, for example, the recovery service 500. Then, at block 820 the persistent region key generator 315 of the key generator 305 receives a recovery public key from the recovery service 500 to which the registration request was sent at block 815. At block 825, the persistent region key generator 315 combines the disposable public key generated at block 810 with the recovery public key received from the recovery service 500 at block 815 to determine a combined public key for the process (P). For example, at block 825 the persistent region key generator 315 can use any appropriate technique for combining public keys such that data encrypted by the combined encryption key can be decrypted using any of the individual private keys paired with the public keys that were combined.

At block 830, the ephemeral region key generator 310 determines the ephemeral region key pair for the process (P) using the disposable public/private key pair determined at block 810. For example, at block 830 the ephemeral region key generator 310 can use the disposable public key determined at block 810 to be the encryption key of the ephemeral region key pair, and the disposable private key determined at block 810 to be the decryption key of the ephemeral region key pair. At block 835, the persistent region key generator 315 determines the persistent region key pair for the process (P) using the combined public key generated at block 825 and the disposable private key determined at block 810. For example, at block 835 the persistent region key generator 315 can use the combined public key determined at block 825 to be the encryption key of the persistent region key pair, and the disposable private key determined at block 810 to be the decryption key of the persistent region key pair.

At block 840, the key generator 305 stores the ephemeral region key pair determined at block 830 and the persistent region key pair determined at block 835 in the corresponding ephemeral region key pair entry 430 and persistent region key pair entry 435 of the key table 425 for the process (P). Execution of the example process 800 then ends.

Instead of performing the processing at blocks 820-825 to determine the persistent region key pair, in some examples the persistent region key generator 315 can receive a recovery public key and an associated recovery private key from the recovery service at block 820. The persistent region key generator 315 can then use the received recovery public and private keys as the respective encryption and decryption keys of the persistent region key pair determined at block 835. In yet other examples, the persistent region key generator 315 can generate a second local public and private keys different from the public and private keys generated at block 810 to be used as the respective encryption and decryption keys of the persistent region key pair determined at block 835. In such examples, the persistent region key generator 315 can provide this second public/private key pair to the recovery service 500 as part of the registration request at block 815 for use as the recovery encryption and decryption key pair. In the preceding examples, if the persistent region key pairs are stored locally at processing node 100 in volatile memory, these keys will be lost after a power loss, thereby still securing the persistent region 210 of the NVM 110 from, for example, malicious attackers. However, the persistent region key pairs are still available at the recovery service 500 for use in recovering data stored in the persistent region 210 of the NVM 110.

Figure 9:
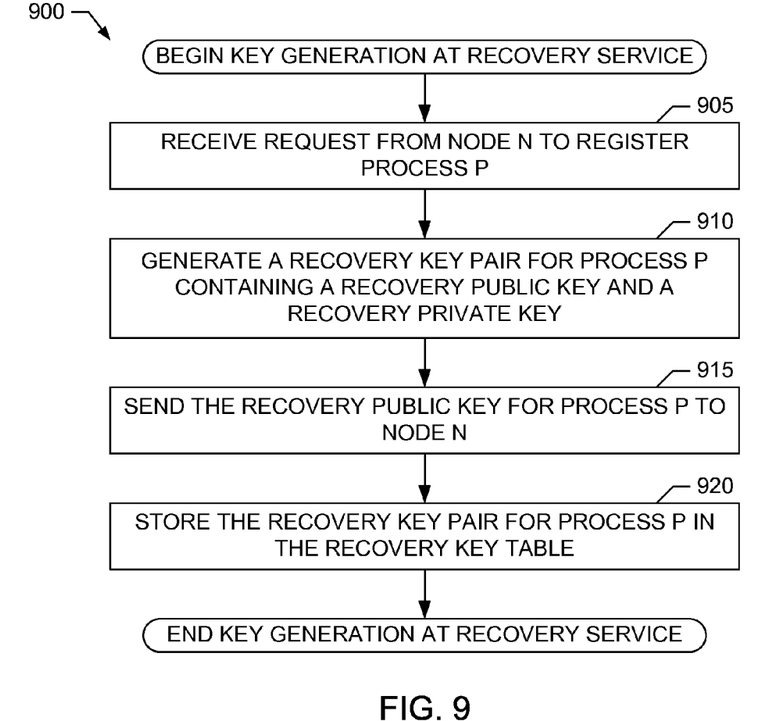
FIG. 9 is a flowchart representative of an example process to perform key generation that may be used to implement the example recovery service of FIG. 5.

An example process 900 that may be executed to implement the recovery key generator 505 of the recovery service 500 of FIG. 5 is represented by the flowchart shown in FIG. 9. With reference to the preceding figures, the process 900 begins execution at block 905 of FIG. 9 at which the recovery key generator 505 or, more generally, the recovery service 500, receives a registration request from, for example, the processing node 100 (referred to as node N in FIG. 9) to register a particular process (referred to as process P in FIG. 9) for which persistent data in the NVM 110 is to be recoverable. At block 910 (e.g., which may be triggered by the registration request received at block 905), the recovery key generator 505 generates a recovery key pair for the particular process (P). The recovery key pair generated at block 910 contains, for example, a recovery public key and a recovery private key to be associated with the process (P).

At block 915, the recovery service 500 sends the recovery public key to the processing node 100 in response to the registration request. As described above, in some examples the processing node 100 uses the recovery public key to generate a combined key that is to be the encryption key for persistent region(s) 210 of the NVM 110. At block 920, the recovery key generator 505 stores the recovery public and private keys determined at block 910 in the recovery key table 515 of the recovery service. For example, at block 920 the recovery key generator 505 can store the recovery public and private keys in the respective recovery encryption and decryption key entries 540 and 545 indexed by the processing node 100 (N) and process (P). Execution of the example process 900 then ends.

Figure 10:
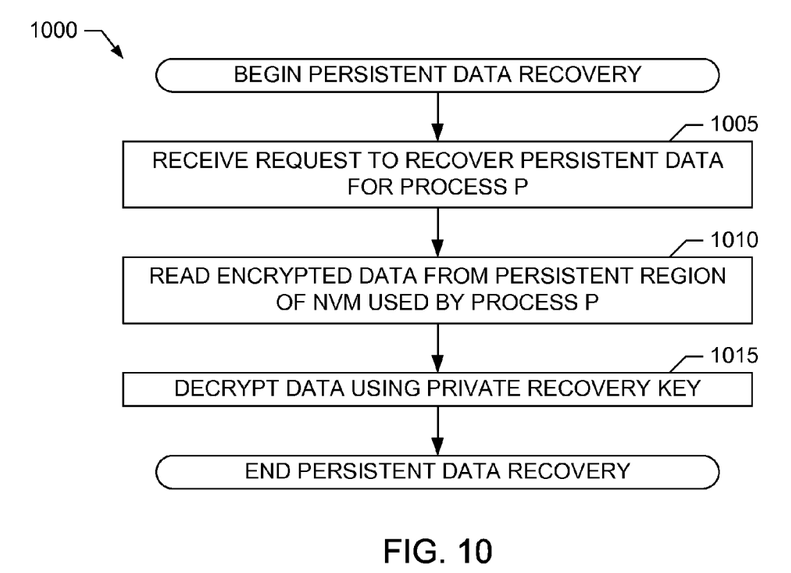
FIG. 10 is a flowchart representative of an example process to recover data from a persistent region of NVM that may be used to implement the example recovery service of FIG. 5.

An example process 1000 that may be executed to implement the data recovery processor 550 of the recovery service 500 of FIG. 5 is represented by the flowchart shown in FIG. 10. With reference to the preceding figures, the process 1000 begins execution at block 1005 of FIG. 10 at which the recovery service 500 receives a request to recover data from, for example, the persistent region 210 of the NVM 110 for a process (P). For example, such a request may be made by an administrator, an automated management service, etc., when a loss of power (intentional or unintentional) associated with the processing node 100 is detected. At block 1010, the data recovery processor 550 reads the data stored in the persistent region 210 of the NVM 110 for the process (P). For example, the data recovery processor 550 can use region boundary information stored in the recovery key table 515 for the process (P) to identify the portion(s) of the NVM 110 designated to be the persistent region 210, as described above. Additionally or alternatively, the persistent region(s) 210 of the NVM 110 may be fixed such that the data recovery processor 550 can identify these persistent region(s) 210 without using boundary information stored in the recovery key table 515.

At block 1015, the data recovery processor 550 retrieves the recovery decryption (e.g., private) key for the process (P) from the recovery key table 515 and uses the retrieved key to decrypt the data that was read from the persistent region(s) 210 of the NVM 110. As noted above, the recovery decryption key used at block 1015 to decrypt and, thereby, recover the data from the persistent region(s) 210 of the NVM 110 can be the same as, or different from, the persistent region decryption key stored locally at the processing node 100 for the process (P). After the data is decrypted and recovered at block 1015, execution of the example process 1000 ends.

FIG. 11 is a block diagram of an example processing system 1100 capable of implementing the apparatus and methods disclosed herein. The processing system 1100 can be, for example, a server, a personal computer, a personal digital assistant (PDA), an Internet appliance, a DVD player, a CD player, a digital video recorder, a personal video recorder, a set top box, or any other type of computing device.

The system 1100 of the instant example includes a processor 1112 such as a general purpose programmable processor. The processor 1112 includes a local memory 1114, and executes coded instructions 1116 present in the local memory 1114 and/or in another memory device. The processor 1112 may execute, among other things, machine readable instructions to implement the processes represented in FIGS. 6-10. The processor 1112 may be any type of processing unit, such as one or more microprocessors, one or more microcontrollers, etc.

The processor 1112 is in communication with a main memory including a volatile memory 1118 and a non-volatile memory 1120 via a bus 1122. The volatile memory 1118 may be implemented by Static Random Access Memory (SRAM), Synchronous Dynamic Random Access Memory (SDRAM), Dynamic Random Access Memory (DRAM), Double-Data Rate DRAM (such as DDR2 or DDR3), RAMBUS Dynamic Random Access Memory (RDRAM) and/or any other type of random access memory device. The non-volatile memory 1120 may be implemented by flash memory and/or any other desired type of memory device. Access to the main memory 1118, 1120 is typically controlled by a memory controller (not shown).

The processing system 1100 also includes an interface circuit 1124. The interface circuit 1124 may be implemented by any type of interface standard, such as an Ethernet interface, a Peripheral Component Interconnect Express (PCIe), a universal serial bus (USB), and/or a third generation input/output (3GIO) interface, and/or any other type of interconnection interface.

One or more input devices 1126 are connected to the interface circuit 1124. The input device(s) 1126 permit a user to enter data and commands into the processor 1112. The input device(s) can be implemented by, for example, a keyboard, a mouse, a touchscreen, a track-pad, a trackball, an ISO point and/or a voice recognition system.

One or more output devices 1128 are also connected to the interface circuit 1124. The output devices 1128 can be implemented, for example, by display devices (e.g., a liquid crystal display, a cathode ray tube display (CRT)), by a printer and/or by speakers. The interface circuit 1124, thus, typically includes a graphics driver card.

The interface circuit 1124 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The processing system 1100 also includes one or more mass storage devices 1130 for storing machine readable instructions and data. Examples of such mass storage devices 1130 include floppy disk drives, hard drive disks, compact disk drives and digital versatile disk (DVD) drives. In some examples, the mass storage device 1130 may implement the recovery key table memory 510 of FIG. 5. Additionally or alternatively, in some examples, the volatile memory 1118 may implement the key table memory 320 of FIG. 3.

The coded instructions 1132 implementing one or more of the processes of FIGS. 6-10 may be stored in the mass storage device 1130, in the volatile memory 1118, in the non-volatile memory 1120, in the local memory 1114 and/or on a removable storage medium, such as a CD or DVD 1132.

As an alternative to implementing the methods and/or apparatus described herein in a system such as the processing system of FIG. 11, the methods and or apparatus described herein may be embedded in a structure such as a processor and/or an ASIC (application specific integrated circuit).

Finally, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to secure non-volatile memory regions, the method comprising:
associating a first key pair and a second key pair different than the first key pair with a process;
using the first key pair to secure a first region of a non-volatile memory for storing first data accessible by the process; and using the second key pair to secure a second region of the non-volatile memory for storing second data accessible by the same process, the second region being different than the first region.

2. A method as defined in claim 1 wherein the first data stored in the first region is retrievable using only a first decryption key included in the first key pair, and the second data stored in the second region is retrievable using either a second decryption key included in the second key pair or a third decryption key different from the second decryption key.

3. A method as defined in claim 1 wherein the first key pair includes a first encryption key and a first decryption key, the second key pair includes a second encryption key and a second decryption key, and further comprising:
generating a first private key and a first public key, the first public key to be the first encryption key and the first private key to be the first decryption key and the second decryption key; and
generating the second encryption key based on the first public key and a second public key.

4. A method as defined in claim 3 further comprising storing the first key pair and the second key pair in volatile memory, the first key pair and the second key pair to be unrecoverable after power is removed from the volatile memory, and the second data stored in the second region, but not the first data stored in the first region, of the non-volatile memory to be recoverable after power is removed from the volatile memory using a second private key associated with the second public key.

5. A method as defined in claim 1 wherein the first key pair includes a first encryption key and a first decryption key, the second key pair includes a second encryption key and a second decryption key, and further comprising:
encrypting data to be written from a cache to the first region of the non-volatile memory for the process using the first encryption key and decrypting data to be read from the first region of the non-volatile memory using the first decryption key to secure the first region of the non-volatile memory for the process; and
encrypting data to be written from the cache to the second region of the non-volatile memory for the process using the second encryption key and decrypting data to be read from the second region of the non-volatile memory using the second decryption key to secure the second region of the non-volatile memory for the process.

6. A method as defined in claim 1 further comprising:
storing the first key pair and the second key pair in a key table associated with the process;
generating a pointer to an entry of the key table to select a key from one of the first key pair or the second key pair to securely exchange data for the process between a cache and the non-volatile memory, the pointer generated based on whether the data is to be exchanged between the cache and the first region of the non-volatile memory, or between the cache and the second region of the non-volatile memory.

7. A method as defined in claim 6 wherein the pointer is a first pointer, and generating the pointer comprises:
determining a second pointer to the key table using a process identifier of the process; and
combining the second pointer with address bits from a tag of a cache line of the cache to determine the first pointer, the cache line to contain the data exchanged between the cache and the non-volatile memory.

8. A method as defined in claim 7 further comprising storing the second pointer in a tag extension of the cache line.

9. A cache controller comprising:
a key retriever comprising executable instructions to:
retrieve a first key associated with a process in response to determining that first process data is to be written from a cache line of a cache to an ephemeral region of a non-volatile memory; and
retrieve a different second key associated with the same process in response to determining that second process data is to be written from the cache line of the cache to a persistent region of the non-volatile memory, the persistent region being different than the ephemeral region; and
a processor comprising executable instructions to:
use the first key retrieved by the key retriever to encrypt the first process data in the cache line of the cache before the first process data is to be written to the non-volatile memory; and
use the second key retrieved by the key retriever to encrypt the second process data in the cache line of the cache before the second process data is to be written to the non-volatile memory.

10. A cache controller as defined in claim 9 wherein the key retriever comprises executable instructions to retrieve a third key associated with the process when third process data is to be read from one of the first region or the second region of the non-volatile, and the processor comprises executable instructions to use the third key retrieved by the key retriever to decrypt the third process data read from the non-volatile memory before the third process data is to be written to the cache line.

11. A cache controller as defined in claim 9 wherein the first key is included in a first key pair stored in a key table in memory, the second key is included in a second key pair stored in the key table, the key retriever comprises executable instructions to combine a first pointer to the key table with addresses bits from a tag of the cache line to determine a second pointer to one of the first key pair or the second key pair, and the key retriever comprises executable instructions to retrieve one of the first key or the second key from the key table based on the second pointer.

12. A cache controller as defined in claim 11 wherein the key retriever comprises executable instructions to store the first pointer in a tag extension of the cache line.

13. A system comprising:
a non-volatile memory;
a cache including a cache line to store data for a process;
a volatile memory to store a key table associated with the process, the key table to store a plurality of different key pairs associated with respective different regions of the non-volatile memory, the different key pairs to be used to securely exchange the data between the cache line and the respective different regions of the non-volatile memory; and
a cache controller to:
combine a key table pointer pointing to the key table and address bits from a tag of the cache line to determine a key pointer pointing to one of the plurality of different key pairs stored in the key table;
retrieve an encryption key included in the one of the plurality of different key pairs pointed to by the key pointer to encrypt the data when the data is to be written from the cache line to the non-volatile memory; and
retrieve a decryption key included in the one of the plurality of different key pairs pointed to by the key pointer to decrypt the data when the data is to be read from the non-volatile memory and written to the cache line.

14. A system as defined in claim 13 wherein the plurality of different key pairs include a first key pair associated with a first region of the non-volatile memory and a second key pair associated with a second region of the non-volatile memory, and the system further comprises a key generator to:
   generate a first private key and a first public key, the first public key to be a first encryption key included in the first key pair, and the first private key to be a first decryption key included in the first key pair and a second decryption key included in the second key pair; and
   generate a second encryption key included in the second key pair based on the first public key and a second public key received from a recovery service.

15. A system as defined in claim 14 wherein the first key pair and the second key pair are unrecoverable after power is removed from the volatile memory, and data stored in the second region, but not the first region, of the non-volatile memory is recoverable after power is removed from the volatile memory by the recovery service using a second private key associated with the second public key.

\* \* \* \* \*